Dec. 17, 1929.   R. W. LOHMAN   1,739,513
VACUUM TUBE
Filed Sept. 4, 1926    2 Sheets-Sheet 1
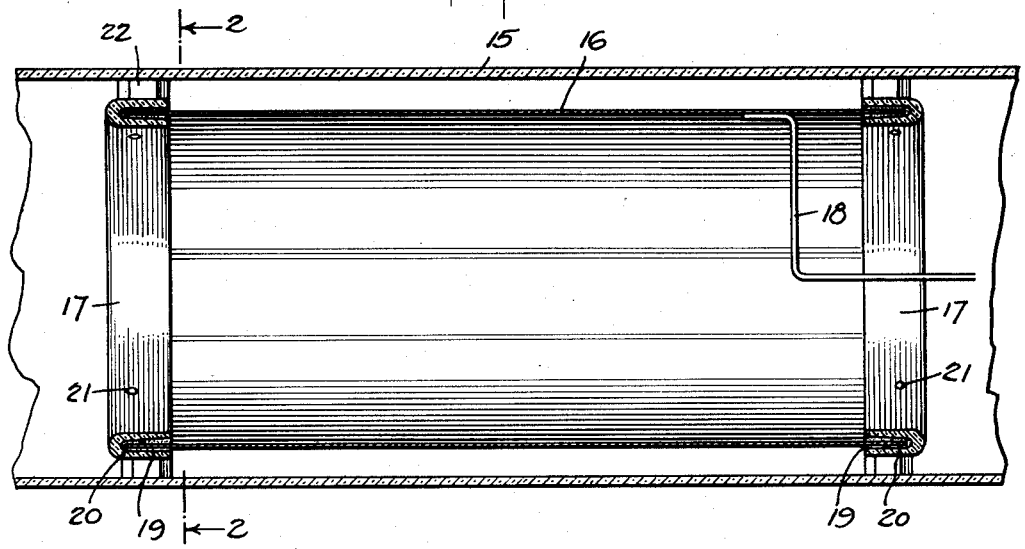
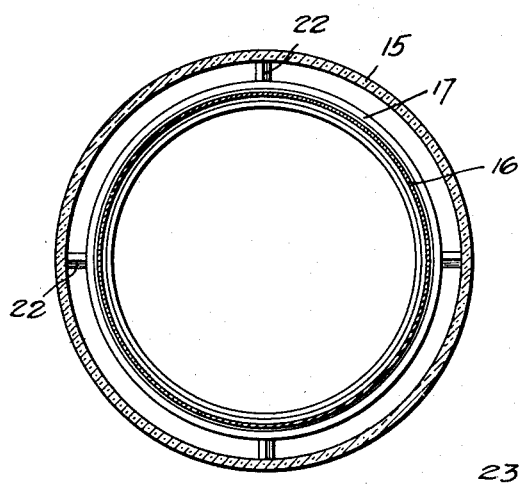
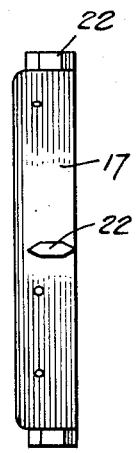
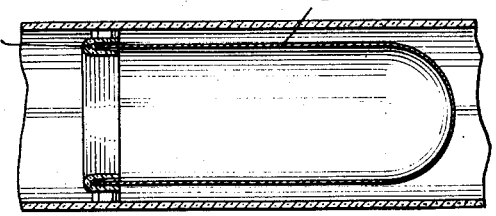
INVENTOR
RALPH W. LOHMAN
BY
ATTORNEY Dec. 17, 1929.  R. W. LOHMAN  1,739,513
VACUUM TUBE
Filed Sept. 4, 1926    2 Sheets-Sheet 2
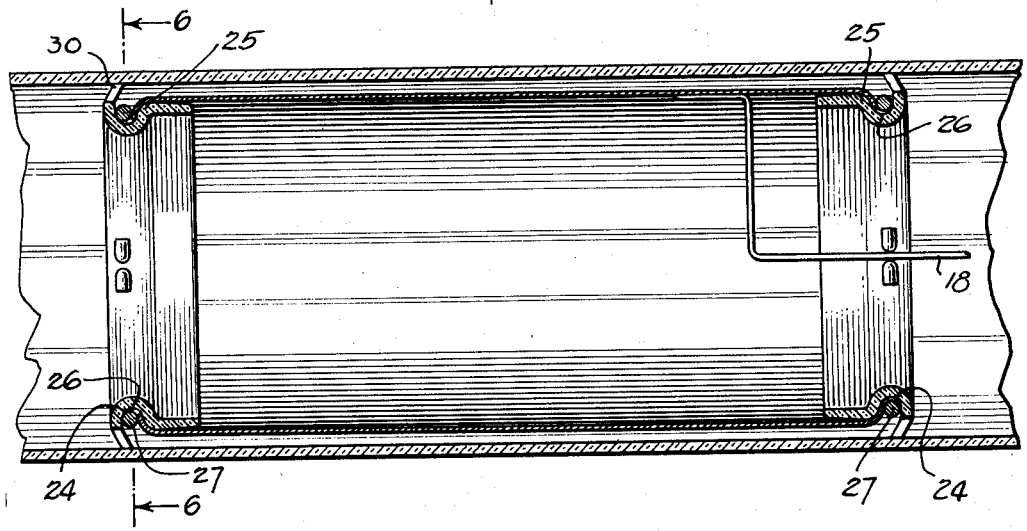
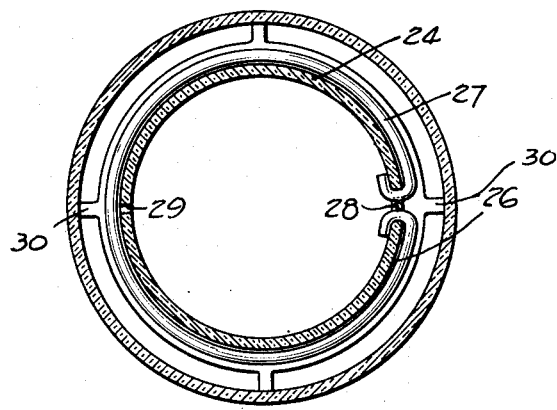
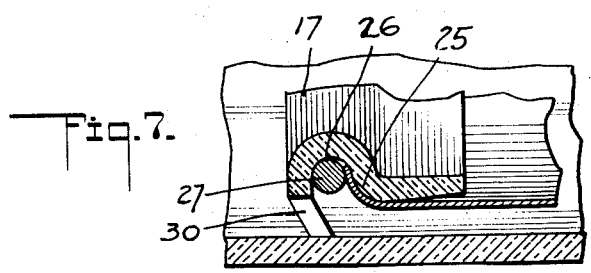
INVENTOR
RALPH W. LOHMAN
BY *Munn & Co.*
ATTORNEY Patented Dec. 17, 1929

1,739,513

UNITED STATES PATENT OFFICE

RALPH W. LOHMAN, OF HOLLYWOOD, CALIFORNIA

VACUUM TUBE

Application filed September 4, 1926. Serial No. 133,674.

It is a purpose of my invention to provide a method of and means for preventing absorption in gaseous or electronically conducting vacuum tubes.

As is well known in the art of manufacturing vacuum tubes, it is necessary during such process to heat the electrodes thereof to quite high temperatures, either by passing the necessary current through the tube from electrode to electrode, under which condition the electrodes are subject to electric stress or potential, and under which condition, coupled with the high temperature, the metal of the electrode is sputtered upon the interior walls of the containing vessel. Or, during the operation of the tube as a source of light, if the potential gradient of the field of the electrode between its surface and the surface of the interior of the container, exceeds certain values at any point or area, the metal of such electrode will be sputtered off.

Now, if a definite potential be applied to a conductor, the electric stress at any area or point thereof depends upon the geometrical form of such area or point. In other words, the distribution of the dielectric flux, or say its concentration at any particular point, may so increase the flux density and the corresponding electric stress, that disruption of the dielectric may occur, since the electric stress or potential gradient, is directly proportional (in a given material, gas etc.) to the flux density.

A common manifestation of these phenomena is that of the brush discharge from a needle point, when suitable potential is applied to the needle—no discharge taking place from any other part of the needle. By plotting the distribution of flux at the ends or edges of a circular, cylindrical or hollow cylindrical conductor, it will be seen that concentration of the flux occurs thereat, the degree of concentration depending upon the radius of curvature, or "sharpness" of the edges.

In the forms of electrodes heretofore used in vacuum tubes, and which generally take the shape of solid or hollow cylinders, in order to provide sufficient area, for the emission of electrons, the greatest potential gradient occurs at the ends of these cylinders or discs, and it is a matter of common observation that the sputtering of the electrode material occurs principally at such places; in fact, the ends of the electrodes will become completely hidden from view by the deposit of metal on the interior glass walls, whereas the portion of the glass wall between the ends remains perfectly clear.

It is, of course, well known that this sputtered metal has the property of adsorbing the chemically active gases rapidly and also even the gases of the helium group, although less rapidly. In order, therefore, to maintain the life of a tube containing say neon, or any other gas, it is most important to prevent the deposit of such metal films and the provision of a method of and means for preventing such deposits constitutes the subject matter of my invention.

My invention, in one embodiment, provides an electrode support, whereby the deposition of such films is prevented through the suppression of excessive local potential gradients on, or in the vicinity of the electrode, since such sputtering is proportional, with a given gas pressure and electrode material to such maximum potential gradient.

Consider the disruptive strength of the insulation (the rarefied gas within the vacuum tube) along any radius from the surface of the electrode to the surface of the inner wall of the vacuum tube: If, along any short distance of this radius, the potential gradient exceeds the disruptive strength of that thickness of insulation, breakdown will occur over that short distance which, in effect, is equivalent to moving the electrode that much nearer to the glass wall; resulting therefrom will be an increased potential gradient upon the remaining thickness of insulation causing its immediate breakdown especially when, as is generally the case, the average dielectric strength of the insulating space has been calculated by dividing the total applied voltage by the total length of the insulating path while, in fact, the potential gradient is greatest near the surface of the conductor, decreasing inversely as the distance therefrom.

The ideal condition for non-sputtering, for a given applied potential and gas pressure is, therefore, a minimum uniform potential gradient from all parts of the electrode to the walls of the vacuum tube. Since the greatest variation in the gradient occurs at the ends or edges of the electrodes, corrections at these areas are of major importance.

Consider a central conductor (the electrode) of relatively small diameter, located coaxially within a larger conductor (or insulator of appreciable capacity) (the vacuum tube): A study of the theory of condensers, which is here involved, clearly indicates that the most economical design, leading to the smallest overall diameter of insulation, requires the material of highest permittivity (specific inductive capacity) to be placed nearest the central conductor, the successive layers of insulation being graded by using materials of decreasing permittivity as the distance from the central conductor decreases. It follows that if the permittivity of the dielectric varies inversely as the distance from the central conductor the potential gradient will have the same value at all parts of the dielectric. In practice it is not feasible to use a very large number of different materials, each having different permittivities, and I have found that the introduction of one or two materials, each of permittivities differing from that of the gas, is sufficient to practically eliminate sputtering.

The above is one method of and means for preventing adsorption embodying my invention.

Another method of and means for preventing adsorption embodying my invention consists in lowering the maximum potential gradient from the surface of the ends or edges of the electrodes by, in effect, increasing the radius of curvatures of those edges or ends.

I will describe only two methods of and two means for preventing adsorption in gaseous or electronically conducting vacuum tubes, and will then point out the novel features thereof in claims.

In the accompanying drawings,

Figure 1 is a view showing in vertical longitudinal section a gaseous or electronically conducting vacuum tube having incorporated therein one means for preventing adsorption embodying my invention.

Figure 2 is a transverse sectional view taken on the line 2—2 of Figure 1.

Figure 3 is a view showing in edge elevation one of the electrode supports shown in Figure 1.

Figure 4 is a view similar to Figure 1, but on a reduced scale showing a sectional support for that type of electrode in which one end thereof is closed.

Figure 5 is a view similar to Figure 1 showing another means for preventing adsorption in vacuum tubes embodying my invention.

Figure 6 is a vertical sectional view taken on the line 6—6 of Figure 5.

Figure 7 is an enlarged, fragmentary sectional view showing the exact manner in which one end of the electrode is secured within one of the supports.

Similar reference characters refer to similar parts in each of the several views.

Referring to Figure 1, 15 designates a vacuum tube which is formed of glass and in which a tubular electrode 16 is supported at its ends by a pair of supports 17, a conductor 18 supplying current to the electrode, as will be understood. As the construction of the two supports 17 is identical, a description of one will suffice for both.

As shown in Figures 1 and 2, the support 17 is of annular form and constructed of an insulating material in such manner as to provide at one side thereof an annular groove 19 which is tapered in cross section, as shown, to receive the corresponding end of the electrode 16 and also to receive a quantity of cement 20, by which the end of the electrode is permanently secured within the groove. At circumferentially spaced intervals, the support is formed with radial openings 21, which intersect the groove 19 in order that they may receive portions of the cement so that when such portions become set they will function as pins for locking the body of cement within the groove, and thus cause the latter to effectively function to permanently retain the electrode end within the support.

On the periphery of the support radially extending lugs 22 are formed at circumferentially spaced intervals and for the purpose of maintaining the support in spaced relation to the tube 15 and centrally thereof in order that the corresponding end of the electrode may be maintained in definite spaced relation to the inner wall of the tube. These radial lugs are tapered in the direction of the axis of the electrode in order to deflect gradually the electronic flow past them, thereby lowering the resistance to such flow, and the heat which would otherwise be generated by such bombardment.

In order that the electronic flow may not be restricted, with consequent loss of energy, the inner and outer diameters of the electrode supports 17 are as large, and as small, respectively, as is consistent with the mechanical strength of the material of which the support is formed. Such a construction allows the greatest possible annular space between the outer surface of the support and the inner surface of the tube. and also, the greatest area of opening through to the interior of the electrode.

In carrying out my invention, the supports 17 are formed of any insulating material possessing high dielectric strength and high permittivity relative to the ambient dielectric. For example, lava may be employed having a permittivity of 3 to 3.5. The cement 20 shall possess permittivity in excess of that of the lava. Preferably a porcelain cement is employed having a permittivity of 4.5 or 5. By reference to Figures 1 and 2, it will be seen that two layers of dielectric are interposed between each end of the electrode and the wall of the tube. With a suitable distribution of the thickness of the respective layers of dielectric and the residual gas layer, it being understood that the tube is adapted to contain a quantity of residual gas such as neon gas, and possessing a permittivity of 1, more or less, so that the maximum electrical stress per unit of thickness in each of the dielectrics may be reduced to a minimum, whereas with a homogeneous dielectric, the stress per unit of the thickness would be a maximum adjacent to the edges or ends of the electrode resulting in a breakdown at these points and successive breakdowns in each succeeding layer.

When the applied potential is very high a composite dielectric or support consisting of more than two materials or layers of suitable permittivities may be employed, and where potential is low, the dielectric support may consist of only one material or layer of the desired permittivity, both of which designs are deemed within the scope of my invention.

It will be perceived that by the employment of such "graded insulation" in a vacuum tube, the total overall thickness thereof will be reduced to a minimum for a given applied potential, the thickness of the layers of the solid insulation being correspondingly reduced. Consequently, the annular space between the outer circumference of the support and the inner circumference of the wall of the vacuum tube, will for a limiting internal diameter of the vacuum tube become a maximum with a corresponding maximum of cross sectional area for the electron stream thus reducing energy losses and heat generation in the vicinity of the electrodes, which is a feature of great importance in the operation of vacuum tubes, the heating of the terminals and the glass adjacent thereto, having heretofore been, in fact, the limiting condition of power input into such tubes, and the reduction or elimination of such heating being one of the objects of this invention.

Referring to Figure 4, I have shown an electrode for vacuum tubes which is of tubular form and has one end thereof closed. This electrode, indicated at 23, is supported by a single support 17, the support being associated with the open end of the electrode in the same manner as described in connection with the support shown in Figure 1.

Referring now to Figures 5, 6 and 7, I have here shown another means for preventing adsorption in vacuum tubes, which effects a reduction of the maximum potential gradient by the provision of a pair of annular supports 24, each of which has a rounded shoulder 25 of appreciable radius and a circumferential groove 26, in which is received one end of the electrode 16, the electrode being spun over the shoulder 25 and then radially inward toward the bottom of the groove. Into this groove is introduced a wire 27 of appreciable radius in a manner to embrace the edge of the electrode and thus secure the electrode to the support. The wire is introduced through two radial holes 28, drilled through the bottom of the groove, and with the ends of the wire bent in the manner shown to securely retain the wire in embracing relation to the edge of the electrode. A third hole 29 is provided in the bottom of the groove to permit the escape therefrom of residual gases during exhaustion of the vacuum tube.

As clearly shown in Figure 7, the wire is in contact with the electrode and hence becomes a part thereof. The potential gradient at the end or edge of the electrode is thus reduced to that determined by the radius of curvature of the wire, and in practice the potential gradient is reduced below that which will cause sputtering of the electrode, as previously described. It will, of course, be understood that one or two such supports may be employed in connection with an electrode. In the present instant I have shown two such supports, but where an electrode of the form shown in Figure 4 is used, only one of such supports is necessary. Each of the supports, as clearly shown in Figure 6, are provided with radial lugs 30, which serve to maintain the supports in spaced relation with respect to the inner wall of the tube and to center such support with respect to the tube.

Although I have herein shown and described only two methods of and two means for preventing the adsorption of vacuum tubes, it is to be understood that various changes and modifications may be made herein without departing from the spirit of the invention and the spirit and scope of the appended claims.

While I have defined the members 17 as supports, these members may be applied to the ends of the electrode solely as a protective covering for the purpose herein specified, and the supporting lugs 22 may be omitted and suitable supports applied to any other part of the electrode.

I claim as my invention:

1. A method of preventing adsorption in a gaseous or electronically conducting vacuum tube containing an electrode having an open end which consists in interposing between the electrode and tube an element of such dielectric strength and permittivity as to lower the maximum potential gradient occurring between said electrode and the wall of the vacuum tube.

2. A method of preventing adsorption in a gaseous or electronically conducting vacuum tube having an open ended electrode which consists in enclosing the edges of the open ends of said electrode in an element of such dielectric strength and permittivity as to lower the maximum potential gradient occurring between said electrode and the wall of the vacuum tube.

3. A method of preventing adsorption in a gaseous or electronically conducting vacuum tube having an electrode provided with open ends which consists in interposing between the open ends of the electrode and the tube, layers of insulating materials of different dielectric strengths and permittivities in such manner that the permittivity of the layers decreases in value inversely with the distance from the electrode.

4. An electrode support for vacuum tubes comprising a body of insulating material of relatively high dielectric strength and permittivity adapted to embrace the edge of a tubular electrode.

5. An electrode support for vacuum tubes comprising an annular body of insulating material provided with a groove adapted to receive the open end of an electrode, and radial lugs on the periphery of the body tapered in the direction of the axis of the body.

6. In a gas containing vacuum tube, an electrode having an open end, and a support for the electrode receiving the open end and having radial lugs for centering the support and electrode within the tube.

7. The combination of a vacuum tube, an electrode having an open end disposed within the vacuum tube, supporting means for the electrode comprising an annular body of insulating material provided with a groove adapted to receive the open end of said electrode, and radial means for holding the body in spaced relation with respect to the vacuum tube, said last named means being tapered in the direction of the longitudinal axis of the body.

8. The combination of a vacuum tube, an electrode structure disposed within the vacuum tube, means for supporting the electrode structure in spaced relation with respect to said vacuum tube, said structure including an electrode having open ends, and a homogeneous envelope of high dielectric strength and of high permittivity relative to the ambient dielectric secured to each of said open ends for lowering the potential gradient at the electrode surface.

9. A method of preventing adsorption in a gaseous or electronically conducting vacuum tube having a cylindrical electrode provided with open ends which consists in interposing between the open ends of the electrode and the tube, layers of insulating materials of different dielectric strengths and permittivities in such manner that the permittivity of the layers decreases in value inversely with the distance from the electrode.

RALPH W. LOHMAN.

Patent No. 1,739,513  Granted December 17, 1929

RALPH W. LOHMAN

The above entitled patent was extended April 24, 1951, under the provisions of the act of June 30, 1950, for 5 years and 298 days from the expiration of the original term thereof.

*Commissioner of Patents.*